(12) United States Patent
Warren et al.

(10) Patent No.: US 9,748,021 B2
(45) Date of Patent: Aug. 29, 2017

(54) CABLE CONNECTIONS

(71) Applicant: British Telecommunications Public Limited Company, London (GB)

(72) Inventors: John Andrew Warren, London (GB); Malcolm Donald Campbell, London (GB); Christopher Munnings, London (GB); Christopher Fisk, London (GB); Ian Hunter, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/320,574

(22) PCT Filed: Jun. 10, 2015

(86) PCT No.: PCT/GB2015/051707
§ 371 (c)(1),
(2) Date: Dec. 20, 2016

(87) PCT Pub. No.: WO2015/198017
PCT Pub. Date: Dec. 30, 2015

(65) Prior Publication Data
US 2017/0146764 A1 May 25, 2017

(30) Foreign Application Priority Data
Jun. 26, 2014 (GB) .................. 1411408.6

(51) Int. Cl.
*H01B 11/00* (2006.01)
*G02B 6/44* (2006.01)
(Continued)

(52) U.S. Cl.
CPC ............ *H01B 11/00* (2013.01); *G02B 6/441* (2013.01); *G02B 6/4404* (2013.01);
(Continued)

(58) Field of Classification Search
None
See application file for complete search history.

(56) References Cited

U.S. PATENT DOCUMENTS 6,134,363 A 10/2000 Hinson et al.
7,049,523 B2 5/2006 Shuman et al.
(Continued)

FOREIGN PATENT DOCUMENTS

DE 29518024 U1 1/1996
EP 0108590 A1 5/1984
(Continued)

OTHER PUBLICATIONS

Office Action for corresponding Korean Application No. 10-2016-7036681 mailed on Feb. 14, 2017; 4 pages.
(Continued)

*Primary Examiner* — Jerry Rahll
(74) *Attorney, Agent, or Firm* — Patterson Thuente Pedersen, P.A.

(57) ABSTRACT

A plurality of telecommunications connections are installed in a distribution network by connecting a series of distribution points using a multicore cable comprising a plurality of cores having a common enclosure, some of the cores carrying fiber tubes into which optical fiber may later be introduced, and other cores carrying an electrical power supply. One or more cores may be diverted from a longer cable run to serve a local distribution point by rupturing a web connecting the core to the rest of the cable, thus allowing the remaining cores to be uninterrupted at the point of divergence. An alternative embodiment intended for underground use provides for apertures to be opened in a protective sheath to expose the individual cores required to be diverted to a local distribution point.

8 Claims, 8 Drawing Sheets

(51) Int. Cl.
*G02B 6/48* (2006.01)
*H02G 7/20* (2006.01)
*H02G 9/06* (2006.01)

(52) U.S. Cl.
CPC .......... *G02B 6/4495* (2013.01); *G02B 6/4416* (2013.01); *G02B 6/4422* (2013.01); *G02B 6/483* (2013.01); *H01B 11/007* (2013.01); *H02G 7/205* (2013.01); *H02G 9/06* (2013.01)

(56) References Cited

U.S. PATENT DOCUMENTS

| | | | |
|---|---|---|---|
| 7,817,891 | B2 | 10/2010 | Lavenne et al. |
| 2007/0098342 | A1 | 5/2007 | Temple, Jr. et al. |
| 2010/0008631 | A1* | 1/2010 | Herbst .................. G02B 6/4416 385/101 |
| 2012/0217061 | A1 | 8/2012 | Runzel, IV et al. |
| 2014/0140669 | A1* | 5/2014 | Islam .................... G02B 6/4416 385/100 |
| 2014/0147086 | A1* | 5/2014 | Chapman ............... H01B 11/22 385/101 |
| 2014/0216782 | A1* | 8/2014 | Erlendsson ............ G01V 1/201 174/11 OR |

FOREIGN PATENT DOCUMENTS

| | | |
|---|---|---|
| EP | 0428931 A2 | 5/1991 |
| EP | 0562770 A2 | 3/1993 |
| EP | 1063656 A2 | 12/2000 |
| GB | 2161614 | 1/1986 |
| GB | 2187305 A | 9/1987 |
| JP | 2001-057115 | 2/2001 |
| WO | WO 2012/071490 A2 | 5/2012 |
| WO | WO 2013/063041 A1 | 5/2013 |

OTHER PUBLICATIONS

International Search Report for corresponding International Application No. PCT/GB2015/051707 mailed on Aug. 21, 2015; 4 pages.
Written Opinion of the International Searching Authority for corresponding International Application No. PCT/GB2015/051707 mailed on Aug. 21, 2015; 5 pages.
International Preliminary Report on Patentability for corresponding International Application No. PCT/GB2015/051707 mailed on Sep. 20, 2016; 13 pages.
Search Report for corresponding GB Application No. 1411408.6 mailed on Dec. 8, 2014; 5 pages.

* cited by examiner

CABLE CONNECTIONS

CROSS-REFERENCE TO RELATED APPLICATIONS

The present application is a National Phase entry of PCT Application No. PCT/GB2015/051707, filed on 10 Jun. 2015, which claims priority to GB Patent Application No. 1411408.6, filed on 26 Jun. 2014, which are hereby fully incorporated herein by reference.

TECHNICAL FIELD

This disclosure relates to cable connections for use in a telecommunications network, and in particular in the distribution network. The distribution network comprises the physical link between each end user installation and the switching node in the network through which all calls or sessions to and from that user are routed.

BACKGROUND

For most of the history of telecommunications, these physical links have comprised wire pairs (usually of copper, and often referred to as the "copper" network) over which electrical signals (which have included both analogue and digital systems at different stages of development) are carried.

The wires themselves are usually either suspended from poles or routed through underground conduits. Both types require some protection from their environment—in particular, overhead wiring requires reinforcement to support its own weight and the forces imposed on it by the wind, or any birds, ice, or debris that land on it. Underground wiring is protected from these forces, but requires protection against damage from ground movements and from excavation by animals or humans. Both types also require waterproofing, and electrical insulation between the two wires in each pair and from any other wire pairs using the same routing.

With the development of fiber optic communication systems in the distribution network, more complex arrangements are becoming necessary. In particular, it is more difficult to connect individual lengths of optical fiber. Instead, hollow tubes are provided, linked together as necessary to provide the complete connection from exchange to end user (or intermediate fiber/wired interface) through which an optical fiber may be introduced to make the actual connection, for example using the process described in European Patent 0108590.

Where a fiber network is being installed, it is often also necessary to make provision for "legacy" copper systems, either for "lifeline" backup services or because it is not possible or desirable to convert all customer premises from copper to fiber at the same time. It is therefore common for copper and fiber connections to be installed in parallel over much of the distribution network. The provision of both types of connection adds to the number of cables required to be provided in the underground ducting or on high-level connections between poles, requiring additional infrastructure and installation costs.

It is often necessary to provide electrical power to operate equipment at one or other end of the connection or at intermediate distribution points, such as an optical/copper interface. Traditionally, power was provided from the exchange, over the copper network. More recently, greater power requirements within the network have made it inefficient to use the traditional copper pairs for power supply from the exchange, so power injection over the copper network from the customer end, or from intermediate points, is becoming more common. The increasing use of optical fiber connections, which require electrical power to generate light signals but cannot be used to deliver electrical power, also increases the requirement for electrical connection to intermediate points in the network.

However, this increases the number of power connections required, increases exposure to tampering with the power supply at intermediate points in the network, and can be unpopular with customers. Moreover, if reliance is placed on collecting power from the customer to power the communications system, the customer's communications connection will fail if the power fails, making it difficult to report that failure to the power supplier.

It is therefore often desirable to provide an electrical connection, primarily configured to deliver electrical power, between the exchange and some point in the distribution network. By configuring it specifically for power rather than communications, some of the inefficiencies described above caused by carrying power over the traditional wire pairs can be avoided. In particular it is possible to use higher voltages, thereby reducing losses in the cable. However, this again requires extra installation work, and extra space in underground ducts or overhead cable installations.

Although topologically each connection (optical, power, or traditional "copper pair") is a single run from the exchange to the customer premises, in practice it may be made up of two or more lengths in series, connected together at distribution points. Individual wire pairs or fiber tubes may be bundled into the same cable over some of these lengths, for example from the exchange to a first distribution point, at which point some or all of the individual connections may continue over different routings.

As distribution points are being placed deeper into the access network, running a separate, dedicated, cable all the way from the exchange to each distribution point is becoming impractical. In many cases such a cable would pass close to other distribution points, and it is therefore preferred to use a single multicore cable for the path to the first distribution point, at which point a second cable, using fewer cores, is connected to the first to provide a connection to the next distribution point. Several distribution points may be "daisy-chained" in this way. However, this requires the multicore cable to be cut and re-spliced at each distribution point, leading to multiple potential failure points in the cable.

SUMMARY

The present disclosure provides a multicore cable comprising a plurality of cores having a common enclosure, at least one of the cores being arranged to carry optical fiber and at least one other core being arranged to carry an electrical power supply, and arranged such that the enclosure may be disrupted over part of its length such that one or more cores may diverge from the other cores, wherein at least one of the cores of the multicore cable is a hollow tube through which optical fiber can be inserted.

The present disclosure also provides a method of installing a plurality of telecommunications connections in a distribution network by connecting a series of distribution points using a multicore cable comprising a plurality of cores having a common enclosure, at least one of the cores being arranged to carry optical fiber and at least one other core being arranged to carry an electrical power supply, and arranged such that the enclosure may be disrupted over part of its length such that one or more cores may diverge from the other cores, and that each of a series of distribution points passed by the multicore cable is connected to one or more of the cores diverging from the cable, wherein at least one of the cores of the multicore cable is a hollow tube through which optical fiber can be inserted In addition to the provision for power and fiber optics, the multicore cable may also carry one or more a wire pairs for telecommunications, either in the same core as one of the fiber or power connections, or in a separate dedicated core.

A wire pair primarily configured for power supply rather than plain telecommunications can be optimized for high voltages, for example standard domestic mains voltages of 110 or 230V, requiring more insulation but a smaller cross-section of wire: such a configuration can be both lighter and cheaper than standard telecommunications wiring configured for operation at about 48V. Distribution points having suitable downconverters installed can then be supplied with power by these connections, without requiring modification to any other distribution points which require traditional low-voltage telecommunications connections, for which separate wire pairs for electric telecommunications services may also be included in the cable. By combining the power and fiber cores in one and the same cable, both infrastructure and installation costs can be reduced. In particular, smaller ducts are required for underground installation, fewer suspension points are required on each fixing point for overhead installation, and in both cases installation can be done more quickly and efficiently, and installation staff exposed for less time to hazardous conditions, such as working at height or in confined spaces.

The designs of the multicore cables would depend on their intended use: in particular whether they are intended to be used for overhead applications or for subterranean applications. In an embodiment for use in an overhead application, in which the cable is suspended from elevated suspension points on poles or other structures, the cable can comprise a strengthening core capable of withstanding any forces acting on the cable, including its own weight, around which are arranged a number of other cores, each comprising one or more wire pairs, or one or more fiber tubes, or a mixture of both in the same core. The strengthening core and each of the other cores are connected by frangible webs which are integral with at least an outer encapsulation of each core.

In use, such a multicore cable can be attached to a run of suspension points on structures such as buildings, or poles installed for the purpose, passing a number of distribution points. At the closest suspension point to each individual distribution point, the required number and type of cores can be peeled off the central core by cutting the frangible web back to the desired branch point. The cut only needs to be made to the length necessary to connect the required cores to the distribution point, which will typically be located on or close to the structure supporting the suspension point, but at a lower, more accessible, level. Typically, the branch, being the same length as the multicore cable from which it has been peeled, would require cutting to the much shorter length required to reach the distribution point from the branch point (typically the height of the suspension point above the distribution point itself). However, unlike the prior arrangements in which all the other cores would have to be cut and spliced at each branch point, only the core or cores to be terminated there need to be cut at this point.

In some embodiments, a number of individual cores are attached in a common enclosure or encapsulation, connected by a shared web to the rest of the multicore cable, and only some of those cores are required to be terminated at the distribution point. In such a case the remaining cores can be spliced back in to the continuation of the multicore. However, again only those cores sharing encapsulation with the terminated cores need to be spliced in this way.

In an underground embodiment, the individual cores are all enclosed in a sheath of a material and structure suitable for protecting the cores from damage by excavation, water ingress, ground movements etc. The sheath is designed such that apertures may be opened in it to gain access to the individual cores within. The sheath may be designed in such a way that such an aperture may be created at any required point, or there may be special locations at intervals along its length, in which case the user selects and opens whichever one of the special locations is closest to the optimum branch point. Having opened the aperture, the user can then extract a core by withdrawing a loop of the core from the sheath until sufficient length has been extracted to form the branch, and then cutting to length. This process can be repeated for as many cores as are required to be terminated at that point.

In both cases the unused length of each core beyond the termination point may be discarded, or it may remain attached in order to preserve the rigidity and strength of the remaining cable run. It is of course desirable that the individual cores are readily distinguishable from each other—e.g. by different colored coverings, or by means of continuity tests, to ensure that a core selected to be connected at a branch point is not the disconnected surplus of a core that has been branched off closer to the exchange, or conversely that a core to be branched off and severed at one location is not already in use to serve another location further from the exchange.

BRIEF DESCRIPTION OF THE DRAWINGS

Embodiments of the disclosure will now be described, by way of example and with reference to the drawings, in which.

DETAILED DESCRIPTION

Figure 1:
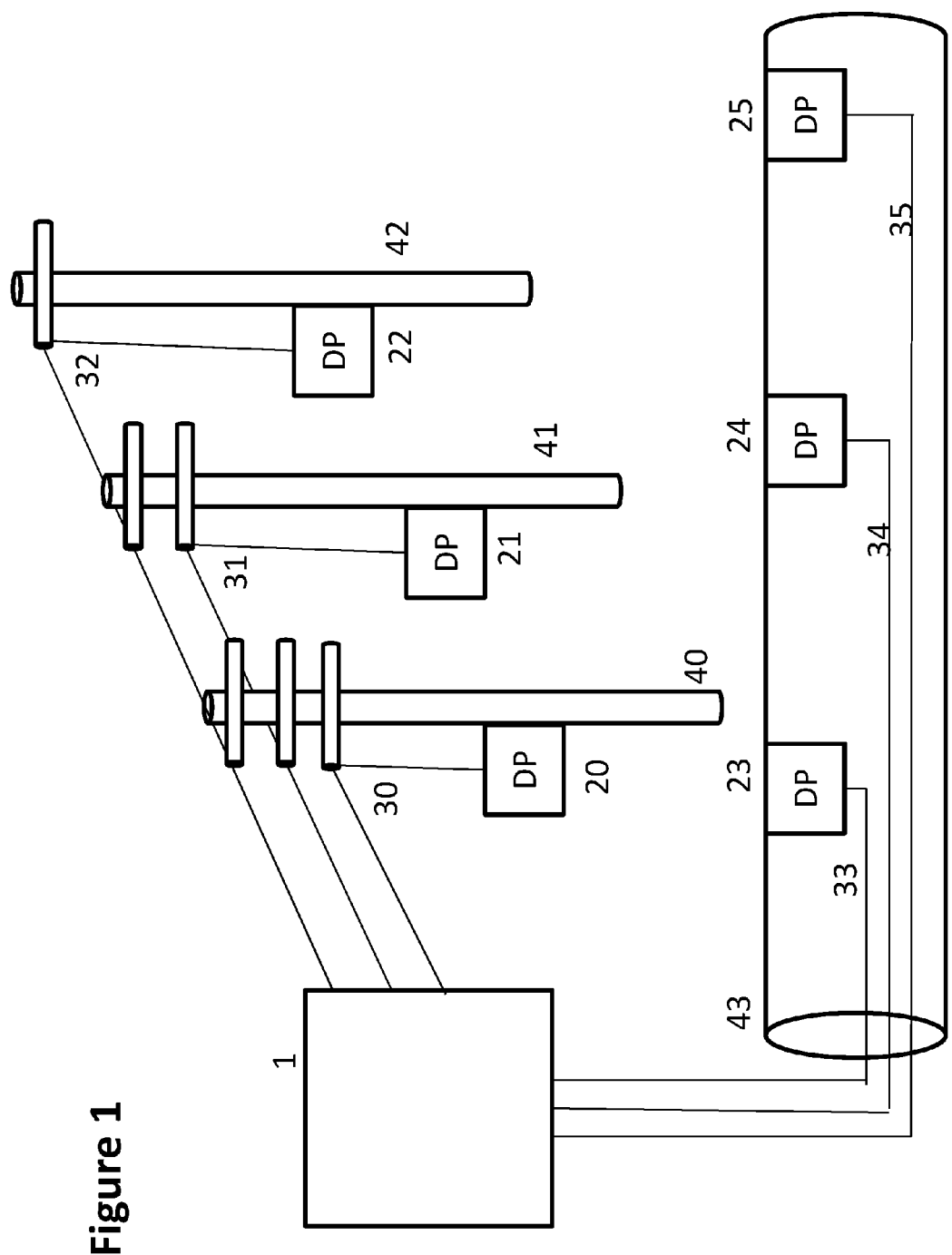
FIG. 1 is a schematic depiction of a first prior art arrangement.

In the prior art arrangement shown in FIG. 1, a number of distribution points 20, 21, 22, 23, 24, 25 are each served by a respective cable 30, 31, 32, 33, 34, 35 connecting the distribution point to an exchange (switch) 1. As shown, some of the distribution points 20, 21, 22 are mounted on poles 40, 41, 42, and the cables 30, 31, 32 are suspended from the poles. In particular, some poles, e.g. pole 40, support cables serving more distant distribution points 21, 22 as well as terminating a cable 30 at the distribution point 20 mounted on or near that pole.

FIG. 1 also depicts an underground conduit 43 carrying a plurality of cables 33, 34, 35 each serving a respective distribution point 23, 24, 25 located within or accessible from the conduit.

It will be recognized that installing a separate cable to serve each distribution point would be cumbersome. Moreover, because of changes in technology, and differing customer needs, it is often necessary to provide several types of communications connection to each distribution point, and different combinations of connections may be required at each. For example, some distribution points may require more fiber optic connections than others. Some distribution points may also require a power supply from the exchange 1. This can result in several cables being run between each distribution point and the exchange 1.

Figure 2:
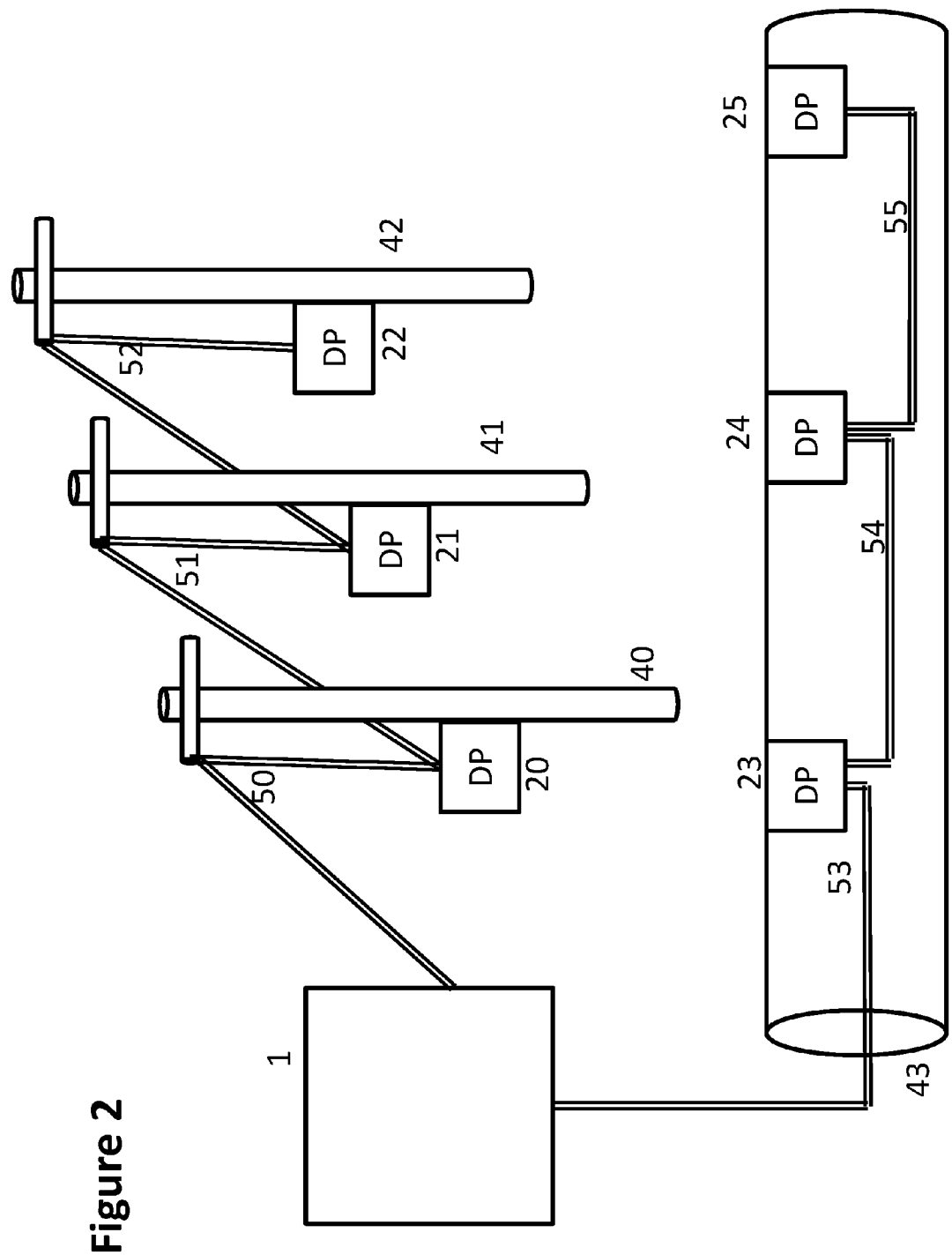
FIG. 2 is a schematic depiction of a second prior art arrangement.

FIG. 2 illustrates an alternative prior art arrangement, in which several distribution points 20, 21, 22 (or 23, 24, 25) are connected to the exchange 1 and each other by a series of lengths of multicore cable 50, 51, 52, 53, 54, 55. One length 50 of cable connects the exchange 1 to a first pole-mounted distribution point 20, and respective further lengths 51, 52 connect the first distribution point 20 to the second distribution point 21, and the second distribution point 21 to the third distribution point 22.

Similarly, in the conduit system 43, one length of cable 53 connects the exchange 1 to a first distribution point 23, and respective further lengths 54, 55 connect the first distribution point 23 to the second distribution point 24, and the second distribution point 24 to the third distribution point 25.

Typically cable is made in very long lengths, and it is preferable to minimize the number of joints or splices in them, in order to avoid structural weakness or electrical or optical impairment at the joints. However, in arrangements such as depicted in FIG. 2, it is necessary to install multiple short lengths of cable 50, 51, 52 (or 53, 54, 55) to reach the more remote distribution points 21, 22, 24, 25 in order to serve the other distribution points 20, 23 passed on the way. This requires the cable to be severed at each distribution point passed.

The present disclosure uses a novel design of cable which avoids the problems described above. Different embodiments of such cable are configured for overhead and underground use.

Figure 3:
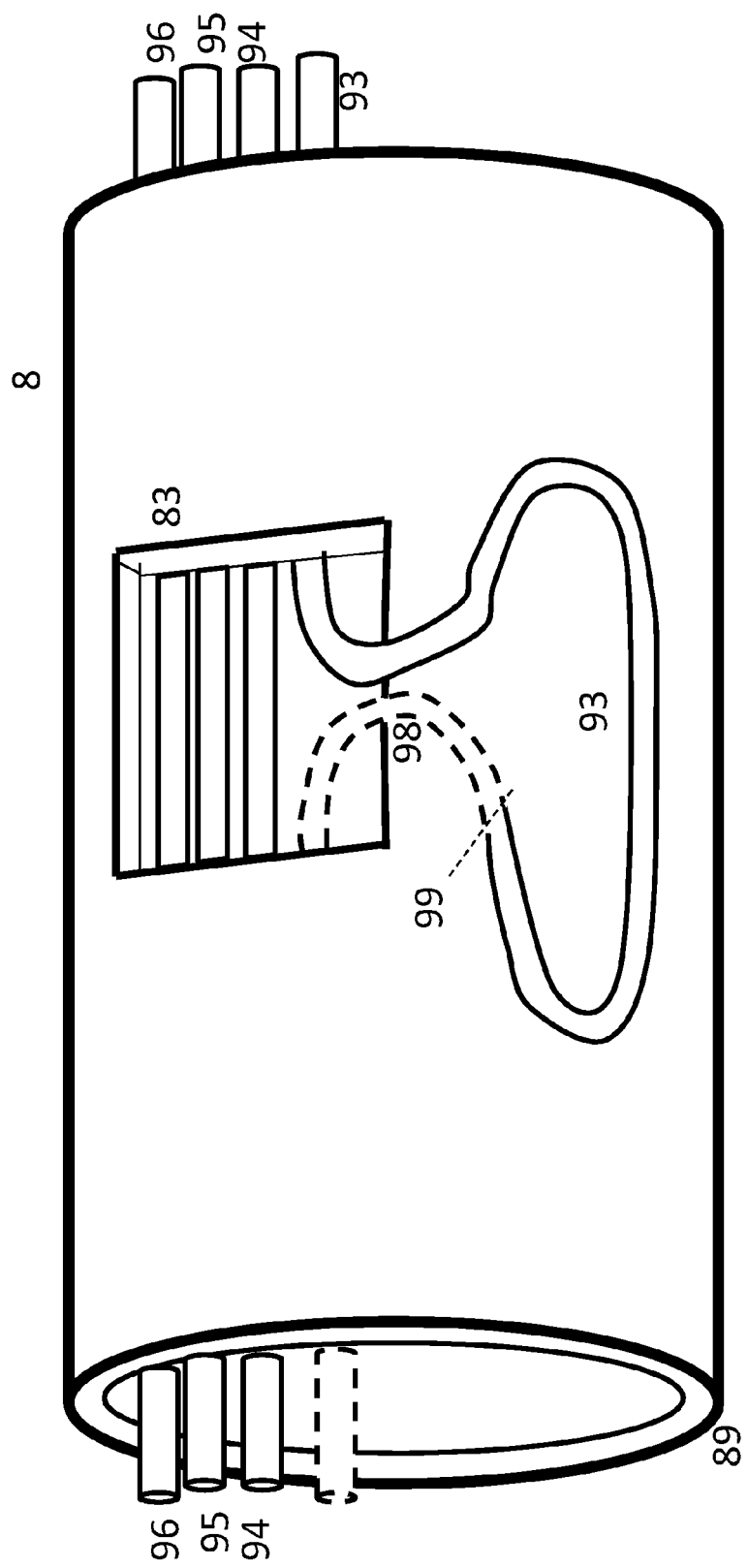
FIG. 3 is a schematic depiction of a section of cable according to an embodiment of the disclosure, intended for subterranean installation.

Referring first to FIG. 3, a section of multicore cable 8 is depicted. This comprises a number of individual cores 93, 94, 95, 96 enclosed in a protective sheath 89. Although only four cores are depicted, in practice many more may be included. Typically some of the cores 96 will carry wire pairs, either for power supply or communications, and others 93 94, 95 will be fiber tubes, through which optical fiber may be inserted after the complete end-to-end run is installed. Each core may itself carry a number of wire pairs or fiber tubes, or a combination of both.

The sheath 89 is arranged such that apertures 83 (84, 85) may be opened in it at intervals along its length. The material of the sheath may be such that an aperture may be opened with a suitable cutting tool at any point along its length, or special weakened sections may be included at intervals to allow such apertures to be created. The individual cores 93, 94, 95, 96 are accessible to an operative through these apertures 84.

Figure 4:
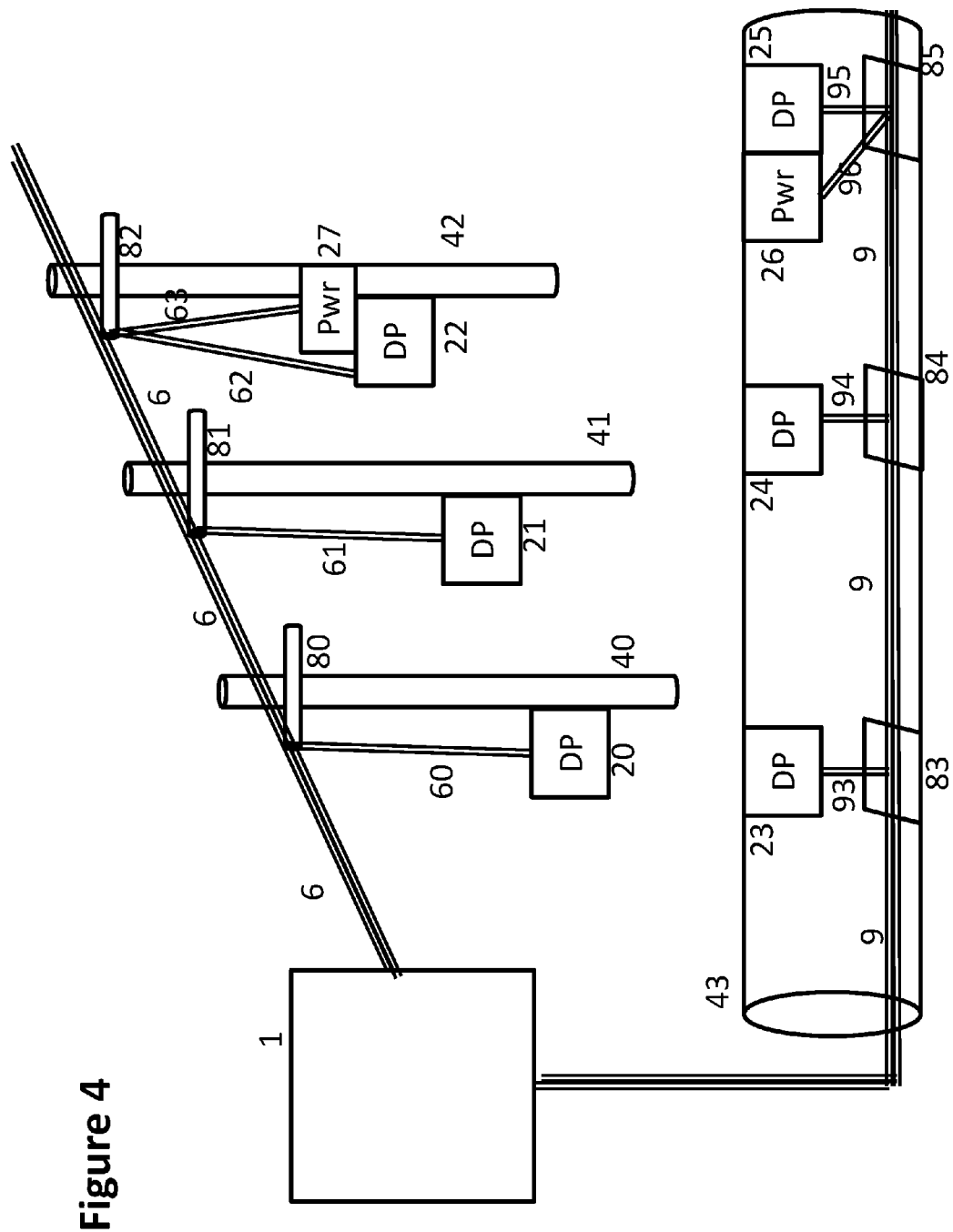
FIG. 4 is a schematic depiction of a distribution network using cables configured according to an embodiment of the disclosure.

The installation process of the subterranean cable will now be described, with reference to FIG. 3 and FIG. 4. As shown in FIG. 4, the cable 8 is first installed in the conduit 43, passing the distribution points 23, 24, 25 that are to be connected to the exchange 1. In the vicinity of each distribution point 23, 24, 25, an aperture (83, 84, 85) is opened in the sheathing material 89. The operative can then grasp a core 93 by hand or with a suitable tool, and draw a loop of the core through the aperture 83 until a length of the core 93 has been withdrawn that is sufficient to be connected to the distribution point 23. Any surplus length 98 of the core 93 can then be cut off (99). Thus a branch 93 has been formed in the multicore cable 8, without severing any of the other cores 94, 95, 96 not terminating at the distribution point.

Similar branches to other distribution points 24, 25 may be created by opening further apertures 84, 85 and extracting the required cores 94, 95, as shown in FIG. 4.

If required, and as shown in FIG. 4, two or more cores 95, 96 may be branched off the cable 8 through one aperture 85. In the example shown in FIG. 4, a distribution point 25 is to be powered from the exchange 1 and therefore requires an associated power input 26, capable of converting a 110V/230V supply delivered by the exchange to the voltages required by the distribution point 25 itself. The power can be delivered by connecting a power core 96 to the power input 26 associated with the distribution point 25. This core 96, together with the optical fiber core 95 connected to the distribution point 25, are both accessed through an aperture 85.

Further embodiments will now be described, with reference to FIG. 4, FIG. 5, FIG. 6, FIG. 7 and FIG. 8. This embodiment is intended for overhead installation.

Figure 5:
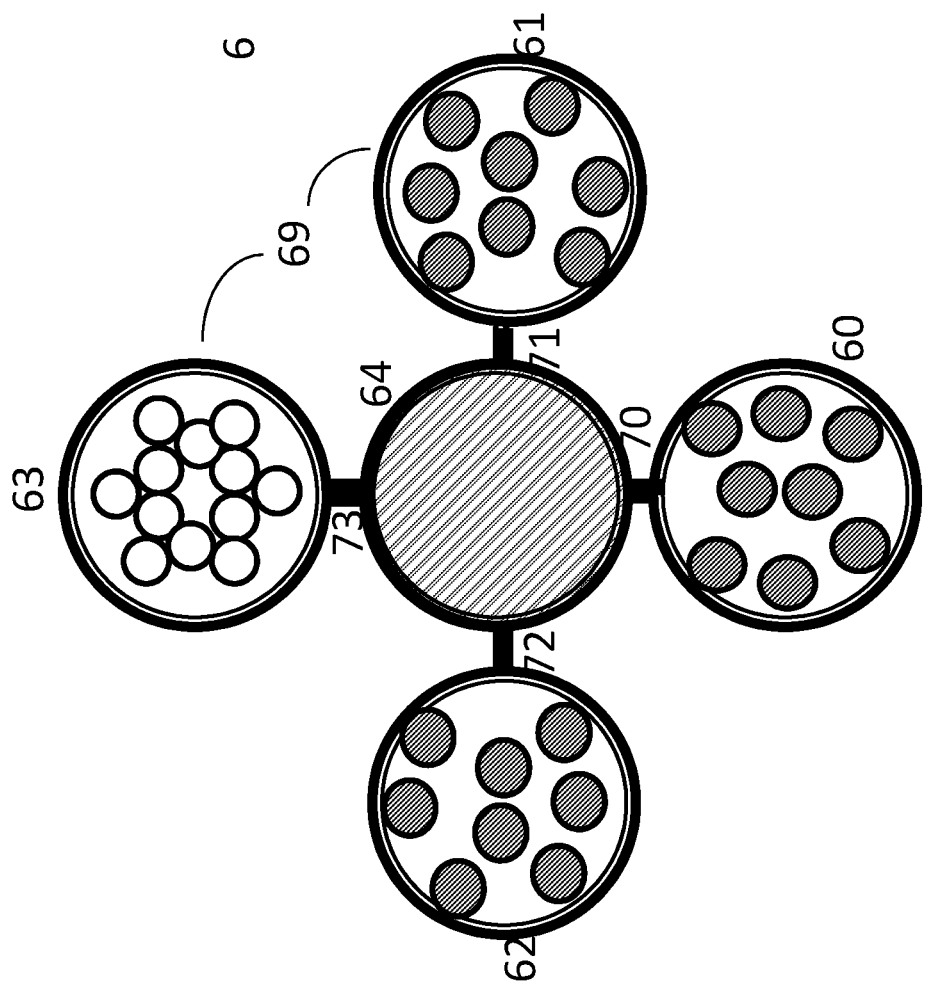
FIG. 5 is a schematic depiction of a cross section of a cable according to an embodiment of the disclosure, intended for overhead installation.

FIG. 5 depicts a cross section of a multicore cable 6 for use in embodiments of the disclosure. This cable comprises a number of cores 60, 61, 62, 63, 64 all surrounded by a common enclosure 69. The enclosure 69 defines a plurality of lobes 60, 61, 62 63 forming individual cores, connected by integral frangible webs 70, 71, 72, 73 to a central core 64 forming a strengthening member. In this embodiment three of the cores 60, 61, 62 each contain eight wire pairs, and a fourth core contains twelve fiber tubes, but this is only illustrative and the number and structure of individual cores can be varied.

This cable may be produced by a series of extrusion processes, first to generate the individual cores 60, 61, 62 63 and then, bunched together, extrude through a further extrusion die to encase the individual cores in an outer layer 69 incorporating the webs 70, 71, 72, 73. Alternatively the outer parts of the individual cores 60, 61, 62, 63 may be softened, and then deformed and adhered together to become a single outer layer incorporating the webs.

Figure 6:
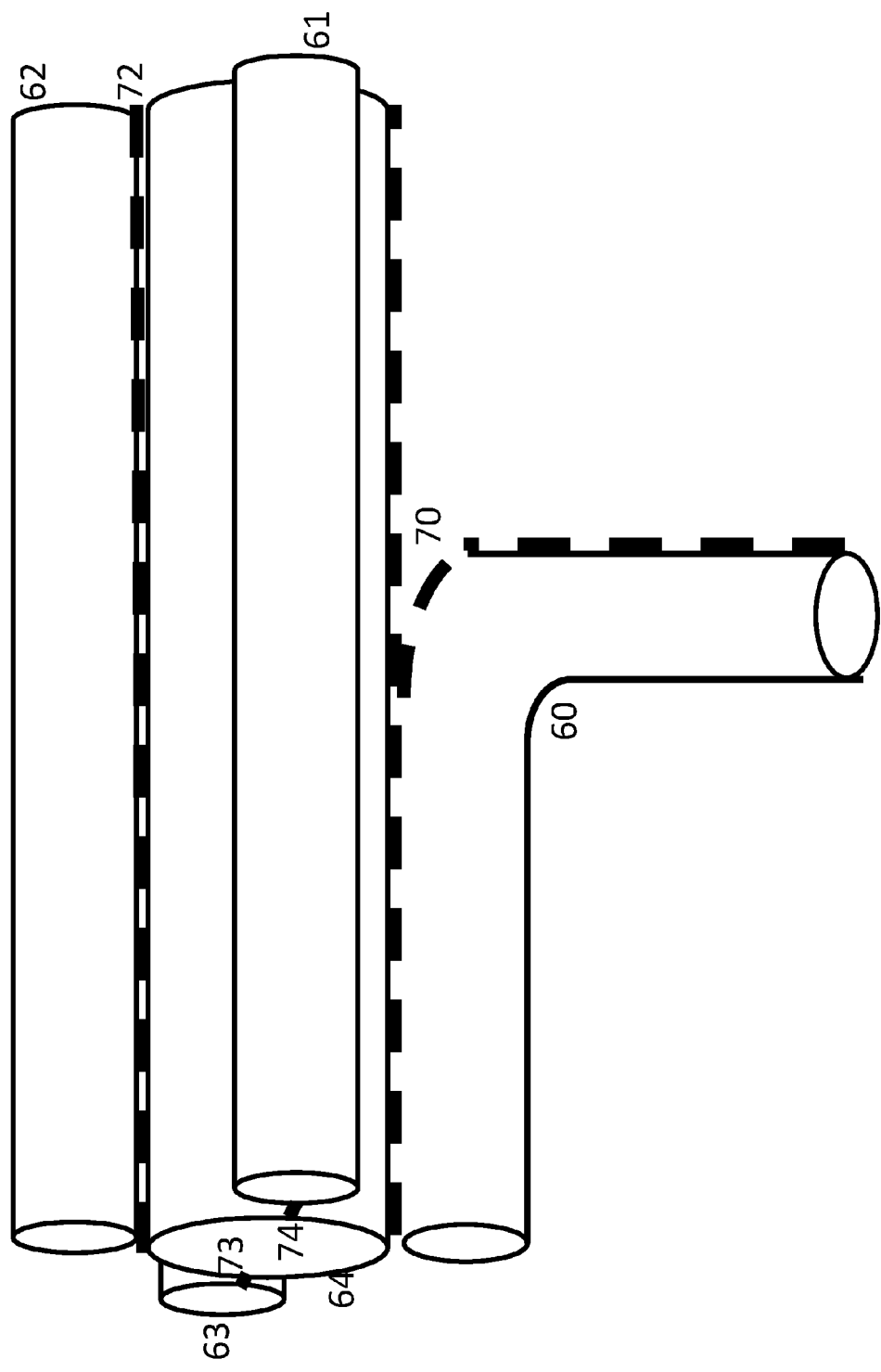
FIG. 6 is a schematic depiction of a section of the cable of FIG. 5, in use.

FIG. 6 depicts a short section of the cable 6. As can be seen, one of the cores 60 has been partially separated from the central member 64 by tearing the web 70.

The installation of the overhead cable 6 will now be described, with reference to FIG. 4. As shown in FIG. 4, the cable 6 is first connected to a number of poles 40, 41, 42. Distribution points 20, 21, 22 that are to be connected to the exchange 1 are mounted on, or close to, at least some of these poles.

The core or cores 60 which are to be connected to a particular distribution point 20 are separated from the main core 64 over the distance between the required branching point 80 and a convenient point some distance further from the exchange 1—this can typically be the next pole top 81—and the core can then be cut to length at that point. Thus a branch 60 has been formed in the multicore cable 8, without severing any of cores 61, 62, 63 not terminating at the distribution point 20. The newly free end of the core 60 can then be connected to the distribution point 20.

Similar branches to other distribution points 21, 22 may be created by peeling off the required cores 61, 62, as shown in FIG. 4.

If required, and as shown in FIG. 4, two or more cores 62, 63 may be branched off the cable 6 at the same suspension point 82. In the example shown in FIG. 4, a distribution point 22 is to be powered from the exchange 1 and therefore requires an associated power input 27 capable of converting a 110V/230V supply delivered by the exchange to the voltages required by the distribution point 25 itself. The power can be delivered by connecting a power core 63 to the power input 27 associated with the distribution point 22. This core 63, together with the optical fiber core 62 connected to the distribution point 22, are separated from the central core 64 by rupturing the respective webs 73, 72.

Figure 7:
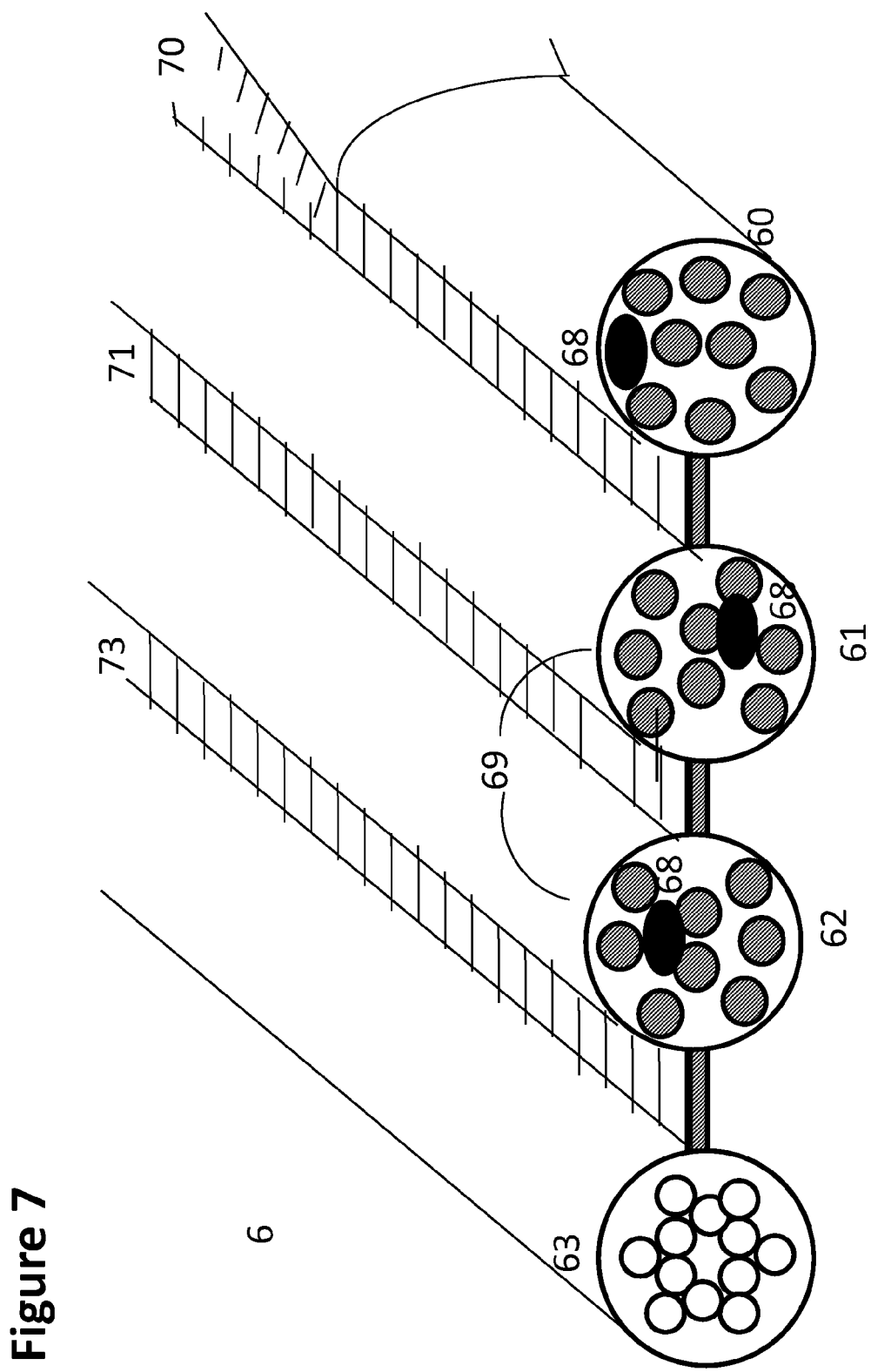
FIG. 7 is a schematic depiction of an alternative embodiment.

An alternative embodiment is depicted in FIG. 7, in which the cores 60, 61, 62, 63 are arranged side-by-side instead of around a central strengthening core 64, with each core connected to its neighbors by a frangible strip 70, 71, 73. The required core (e.g. core 60) can then be separated from its neighbor by tearing the respective frangible strip 70. In this embodiment, each of the cores 60, 61, 62 containing power cables also carries a wire pair 68 suitable for conventional telecommunications.

Figure 8:
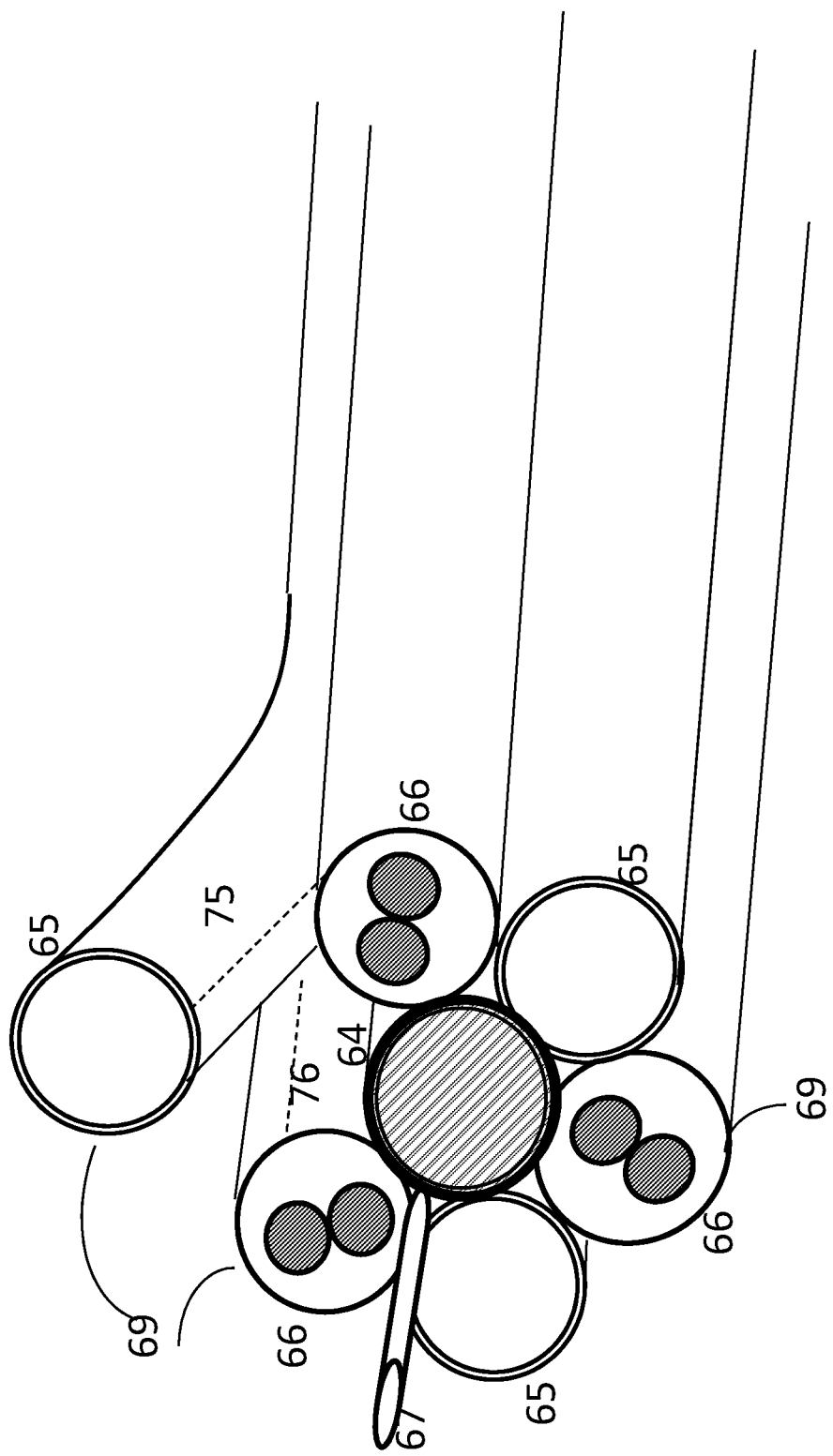
FIG. 8 is a schematic depiction of an alternative embodiment.

A further embodiment is depicted in FIG. 8, in which each core 65, 66 comprises a single fiber tube (65) or power connection (66), each core being connected by webs 75, 76 to the central strength member 64. One of the cores 65 is shown partially separated from its neighbors in order to diverge from the main cable run to serve a nearby distribution point. A separate core 69 carries a wire pair for conventional telecommunications.

These embodiments can be formed in a similar way to that described for the embodiment of FIGS. 5 and 6, by means of a suitably shaped die for the extrusion process.

The invention claimed is:

1. A method of installing a plurality of telecommunications connections in a distribution network comprising:
   connecting a series of distribution points to an exchange using a multicore cable connected to the exchange and comprising a plurality of cores having a common enclosure, at least one of the cores being a hollow tube through which optical fiber can be inserted and at least one other core being arranged to carry an electrical power supply, and arranged such that the enclosure may be disrupted over part of a length of the enclosure;
   connecting each of a series of distribution points passed by the multicore cable to one or more of the cores by disrupting the enclosure at a divergence location close to the respective distribution point to allow a length of the or each core that is to be connected to the distribution point to be separated from the multicore cable core at the divergence point;
   cutting the diverging core or cores to a length suitable to reach the distribution point; and
   connecting the diverging core or cores to the distribution point.

2. A method according to claim 1, wherein at least one of the cores of the multicore cable carries a wire pair for telecommunications.

3. A method according to claim 1, wherein the at least one other core being arranged to carry an electrical power supply is connected to voltage converters at the distribution points.

4. A method according to claim 1, wherein the cable comprises a number of cores connected by frangible webs which are integral with at least an outer encapsulation of each core, and in which the webs are ruptured over a length of the cable close to one of the termination points in order to split one or more cores away from the cable such that the one or more cores may be connected to the termination point.

5. A method according to claim 4, wherein the multicore cable is attached to a run of suspension points passing a number of distribution points, and at a suspension point close to each individual distribution point one or more cores are separated from the multicore cable by rupturing the frangible webs to form a branch to the respective distribution point.

6. A method according to claim 1, wherein the individual cores are enclosed in a sheath through which apertures may be opened to gain access to the individual cores within.

7. A method according to claim 6, wherein weaknesses are provided in the sheath at intervals along a length of the sheath to allow the apertures to be created.

8. A method according to claim 6, wherein an aperture is opened in the sheath and a length of one or more cores is withdrawn through the aperture to be connected to a distribution point in the vicinity of the aperture.

* * * * *